United States Patent
Pappu et al.

(10) Patent No.: US 12,117,878 B2
(45) Date of Patent: Oct. 15, 2024

(54) METHODS AND APPARATUS TO REDUCE DISPLAY CONNECTION LATENCY

(71) Applicant: Intel Corporation, Santa Clara, CA (US)

(72) Inventors: Lakshminarayana Pappu, Folsom, CA (US); Nausheen Ansari, Folsom, CA (US); Todd Witter, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/831,173

(22) Filed: Jun. 2, 2022

(65) Prior Publication Data

US 2022/0291733 A1 Sep. 15, 2022

(51) Int. Cl.
*G06F 1/26* (2006.01)
*G06F 1/3203* (2019.01)
*G06F 1/3206* (2019.01)
*G06F 1/3218* (2019.01)
*G06F 1/3287* (2019.01)
*G06F 9/4401* (2018.01)
*G06F 13/40* (2006.01)
*G09G 3/20* (2006.01)

(52) U.S. Cl.
CPC .......... *G06F 1/266* (2013.01); *G09G 3/2096* (2013.01); *G06F 1/3203* (2013.01); *G06F 1/3206* (2013.01); *G06F 1/3218* (2013.01); *G06F 1/3287* (2013.01); *G06F 9/4418* (2013.01); *G06F 13/4081* (2013.01); *G09G 2330/023* (2013.01); *G09G 2370/042* (2013.01)

(58) Field of Classification Search
CPC .... G06F 1/3203; G06F 1/3287; G06F 1/3206; G06F 13/4081; G06F 9/4418; G06F 1/3218; G06F 1/266; G09G 3/2096; G09G 2330/023; G09G 2370/042
USPC ............ 713/300, 323, 324; 710/10, 16, 302
See application file for complete search history.

(56) References Cited

U.S. PATENT DOCUMENTS

| | | | | |
|---|---|---|---|---|
| 7,053,864 B1 * | 5/2006 | Lee | ......................... | G09G 5/006 345/3.4 |
| 7,698,489 B1 * | 4/2010 | Jacoby | .................. | G06F 1/3203 713/323 |
| 8,275,999 B2 * | 9/2012 | Wu | ........................... | G06F 1/26 713/320 |
| 8,635,480 B1 * | 1/2014 | Mimberg | ................ | G06F 1/325 713/323 |
| 8,941,672 B1 * | 1/2015 | Jacoby | .................... | G06F 13/14 713/300 |
| 8,943,347 B2 * | 1/2015 | Khodorkovsky | ..... | G06F 1/3203 713/323 |
| 2009/0224866 A1 * | 9/2009 | Glen | ....................... | G09G 5/006 340/3.43 |

(Continued)

*Primary Examiner* — Ji H Bae
(74) *Attorney, Agent, or Firm* — HANLEY, FLIGHT & ZIMMERMAN, LLC

(57) ABSTRACT

Methods, apparatus, systems, and articles of manufacture are disclosed to reduce display connection latency. An example apparatus includes interface circuitry to: detect when a display is plugged into a port; and notify processor circuitry of the detection. In response to the notification, the processor circuitry of the example apparatus moves discrete circuitry into a high power state. The example apparatus also includes discrete circuitry to, while in the high power state, identify the display.

25 Claims, 9 Drawing Sheets

(56) References Cited

U.S. PATENT DOCUMENTS

2019/0230410 A1\* 7/2019 Paraman .............. H04N 17/004
2021/0034134 A1\* 2/2021 Yu ............................ B60L 1/00

\* cited by examiner

US 12,117,878 B2

METHODS AND APPARATUS TO REDUCE DISPLAY CONNECTION LATENCY

FIELD OF THE DISCLOSURE

This disclosure relates generally to displays and, more particularly, to methods and apparatus to reduce display connection latency.

BACKGROUND

Displays are one of the main interfaces between a user and a compute device. As such, the development and improvement of graphics technology is a key factor in the design of many compute devices. An important component of graphics technology are graphics cards. A graphics card refers a circuit board containing compute resources that are separate from the compute resources of the rest of the compute device and that are specifically designed for graphics applications. In some examples, a manufacturer may develop a graphics card with a standardized input/output so that the graphics card may be connected to any number of compute devices.

BRIEF DESCRIPTION OF THE DRAWINGS

In general, the same reference numbers will be used throughout the drawing(s) and accompanying written description to refer to the same or like parts. The figures are not to scale.

Figure 1:
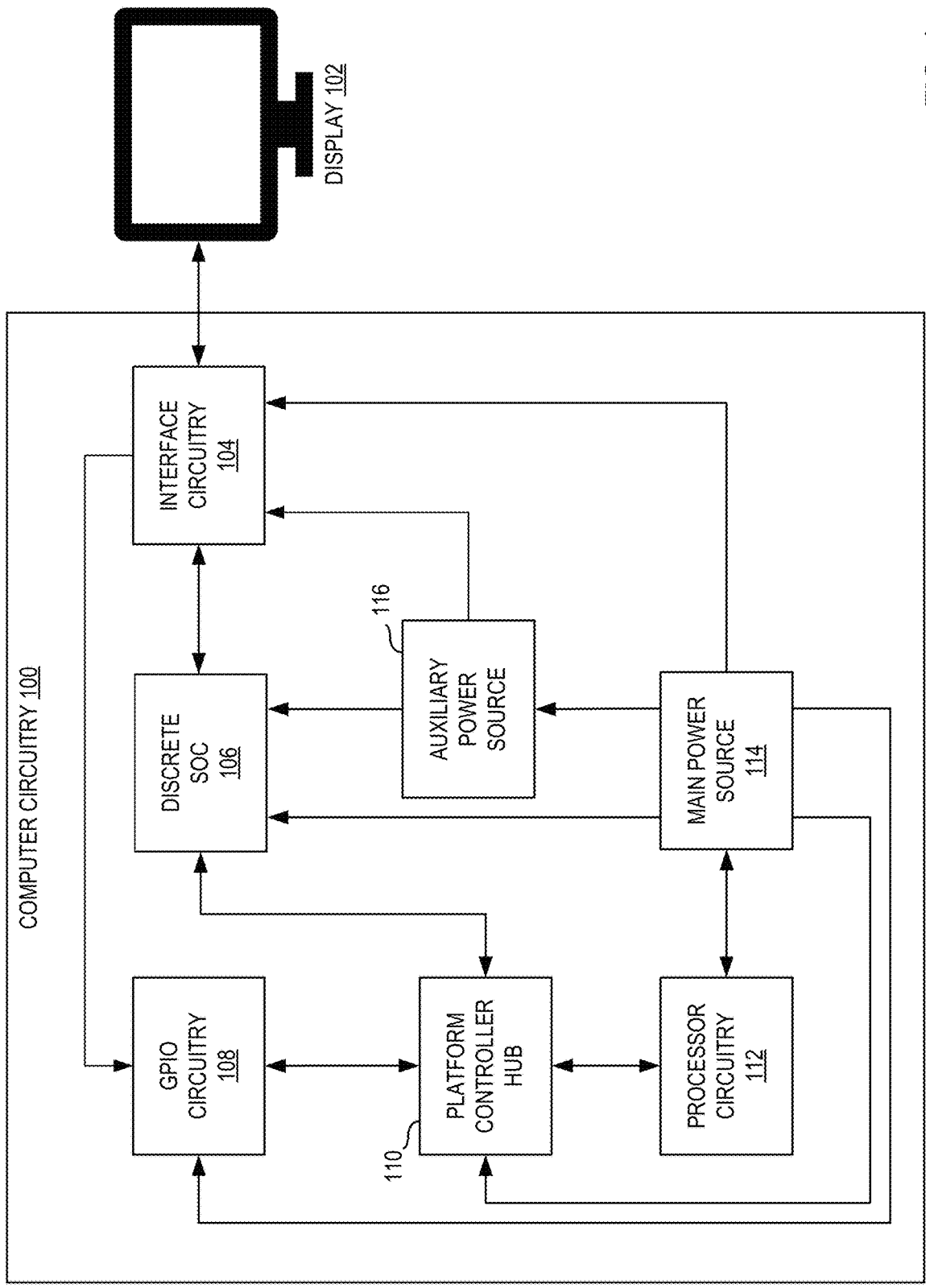
FIG. 1 is a block diagram of an example implementation of computer circuitry.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Some example compute devices may support hot plug functionality. As used herein, hot plug functionality refers to the ability of a compute device to detect and enable a newly connected display while the compute device is still powered on. In such examples, however, hot plug functionality is only supported in certain power states. As used herein, a power state refers to a mode in which some or all of the compute resources may be temporarily powered off. In Microsoft Windows® operating systems, discrete devices such as a graphics card are described in either a D0, D1, D2, D3hot, or D3cold power state. As used herein, "discrete" refers to an ability of a device within a computer to execute instructions independently of a main processor. In the D0 state, the discrete device is fully powered. In the D3hot state, the discrete device receives a minimal amount of power.

Accordingly, in some examples, the D0 state may be referred to as a high power state, and the D3hot state may be referred to as a low power state. In the D3cold state, a main processor removes power from the discrete device (i.e., the discrete device is powered off while other components of a compute device such as the main processor are powered on).

Previous compute devices do not support hot plug functionality of displays when the discrete card that enables the display is in either D3 power state (i.e., D3hot or D3cold). Rather, previous graphics cards require an external event from the compute device (such as input from a mouse or keyboard) to exit the D3 power state. Once awake, previous graphics cards may execute instructions to that the compute device can recognize the display. The need for previous graphics cards to wait for an external event to leave the D3 power state adds latency between when a display is connected and when it can be used, which limits user experience.

Example systems, methods, and apparatus disclosed herein describe a compute device with a discrete graphics card that supports hot plug functionality in both the D3hot and D3cold state. In doing so, examples disclosed herein reduce latency when a display is connected. Example interface circuitry includes platform connector circuitry to generate a wake signal when a display is plugged into a port. If the graphics card (i.e., a discrete System on a Chip (SoC)) is in a D3hot state, the graphics card uses an auxiliary power source to power a small portion of the graphics card. The remaining powered portion of the graphics card sends a message to example processor circuitry.

If the example discrete SoC is in a D3cold state, example General Purpose Input Output (GPIO) circuitry receives the wake signal and sends a message to the processor circuitry instead. Upon receiving a message, the processor circuitry wakes the example discrete SoC. Once moved to into a full power state (i.e., once awake), the example power management circuitry on the discrete SoC sends a second message with a device ID to the example processor circuitry. Example display engine circuitry on the discrete SoC receives configuration parameters from the example processor circuitry and executes a device discovery protocol. While example systems, methods, and apparatus disclosed herein refer to examples with D3 power states, the teachings of this disclosure are not limited in their application to Microsoft Windows® operating systems. Rather, in other examples, systems, methods, and apparatus may support hot plug functionality in any kind of power state using the teachings of this disclosure.

FIG. 1 is a block diagram of an example implementation of computer circuitry. FIG. 1 includes example computer circuitry 100 and a display 102. The example computer circuitry 100 is an example implementation of the processor platform 700. The example computer circuitry 100 includes example interface circuitry 104, an example discrete SoC 106, example GPIO circuitry 108, example platform controller hub circuitry 110, example processor circuitry 112, example main power source 114, and example auxiliary power source 116. The example computer circuitry 100 may include additional components not illustrated in FIG. 1. For example, the example computer circuitry 100 may additionally include one or more memory, additional discrete cards, etc. not illustrated in FIG. 1.

The example display 102 presents graphics on a screen. The graphics are based on computation from the example computer circuitry 100 and example discrete SoC 106. The example display 102 may have any size or resolution, may support any refresh rate, etc. In the illustrative example of FIG. 1, the example display 102 is an external device that is separate from the example computer circuitry 100.

The example interface circuitry 104 connects to the display 102 and communicates with other components of the example computer circuitry 100. For example, the example interface circuitry 104 may detect when a user connects the display 102 to a display port. In response to the detecting the display, the example interface circuitry 104 may notify either the example discrete SoC 106 or the example GPIO circuitry 108. As used herein, the act of a user connecting the display 102 to the example interface circuitry 104 while the example computer circuitry 100 has power may be referred to as a hot plug display (HPD) event. Following an HPD event, the example interface circuitry 104 may receive data from the example discrete SoC 106 and transmit said data to the display 102. While HPD events are caused by the connection of an external device such as the example display 102 to a display port, the example interface circuitry 104 may additionally support displays that are integrated into the example computer circuitry 100. In such examples, the example computer circuitry 100 may be implemented by devices including but not limited to a laptop. Further detail of an example of the interface circuitry 104 is described below in connection with FIG. 2.

The example discrete SoC 106 of FIG. 1 is discrete circuitry that connects to the example interface circuitry 104, example GPIO circuitry 108, and example processor circuitry 112. The example discrete SoC 106 executes instructions to produce graphics on the display 102. The example discrete SoC 106 is discrete in the sense that it may execute instructions independently of the example processor circuitry 112. For example, if the processor circuitry 112 executes a first set of instructions to change values in a memory of the computer circuitry 100, the example discrete SoC 106 may execute a separate second set of instructions to change values in an on chip memory. In some examples, the example discrete SoC 106 and example processor circuitry 112 may execute instructions asynchronously. In some examples, the example discrete SoC 106 may additionally execute instructions to perform other functions unrelated to graphics. Further detail of an example of the discrete SoC 106 is described below in connection with FIGS. 2, 4.

The example GPIO circuitry 108 of FIG. 1 is an integrated circuit that works with the example processor circuitry 112 to perform a function. The example GPIO circuitry 108 includes a communication channel (e.g., a pin) that may be used by example processor circuitry 112 both to receive data from (i.e., input) and send data to (i.e., output) the example discrete SoC 106 or other compute resources. In some examples, the implementation of GPIO pins may be the primary function of the example GPIO circuitry 108. In other examples, the example GPIO circuitry 108 may have additional functionality such as, but not limited to, audio coding, signal processing, etc.

The example platform controller hub circuitry 110 of FIG. 1 controls data paths for certain functionality between the example processor circuitry 112 and compute resources such as the example discrete SoC 106 and example GPIO circuitry 108. Functionality controlled by the platform controller hub circuitry 110 includes but is not limited to clocks, displays, input and outputs, etc. In some examples, the platform controller hub circuitry 110 may implement an architecture that replaces a north bridge and south bridge architecture.

The example processor circuitry 112 of FIG. 1 executes instructions to implement software applications. Some example instructions, when executed, may cause the example processor circuitry 112 to send or receive data, change the power state of an external device, perform an action that causes a graphic on the display 102 to change, etc. The example processor circuitry 112 may be implemented by, for example, the processor circuitry shown in FIG. 7. In some examples, the example processor circuitry 112 may be referred to as a root processor.

The main power source 114 powers the example processor circuitry 112, platform controller hub circuitry 110, example GPIO circuitry 108, example discrete SoC 106, and example interface circuitry 104. The foregoing compute resources use power from the main power source 114 to perform their respective functions. To power the foregoing compute resources, the main power source 114 may receive energy from a battery within the example computer circuitry 100, an external power source such as a wall outlet, etc. The main power source 114 also receives instructions from the example processor circuitry 112. Based on the instructions, the main power source 114 determines when to power various compute resources within the example computer circuitry 100. When a compute resource does not receive power from the example main power source 114, it may enter into a lower power state.

The example auxiliary power source 116 powers at least the example interface circuitry 104 and example discrete SoC 106. In some examples, the auxiliary power source 116 may additionally provide power to other discrete cards implemented within the example computer circuitry 100. In some examples, the auxiliary power source may provide +3.3 volts (V) and be referred to as Run Time D3 support. In FIG. 1, the auxiliary power source 116 accesses the main power source 114 to power compute resources. In other examples, the auxiliary power source 116 may additionally or alternatively receive energy from a battery within the example computer circuitry 100, an external power source such as a wall outlet, etc. Further detail of an example of the auxiliary power source 116 is described below in connection with FIG. 2.

In some examples, an HPD event occurs when the example discrete SoC 106 is in a D3hot or D3cold state. In such examples, the example graphics circuitry detects the display 102 and send a first message to the processor circuitry 112. In the D3hot state, the example discrete SoC 106 may use the auxiliary power source 116 to send the first message directly to the platform controller hub circuitry 110. In the D3cold state, the example interface circuitry 104 may send the first message to the example GPIO circuitry 108, which then forwards the message to the platform controller hub circuitry 110. Upon receiving the first message from the platform controller hub circuitry 110, the example processor circuitry 112 wakes the example discrete SoC 106. Once no longer in a D3 power state, the example discrete SoC 106 may run a software application known as a graphics driver to initiate a device discovery protocol and complete the connection of the display 102. Through this process, the example computer circuitry 100 of FIG. 1 is able to recognize and enable the display 102, even when the example discrete SoC 106 is in a D3 power state and an external event is not provided.

Figure 2:
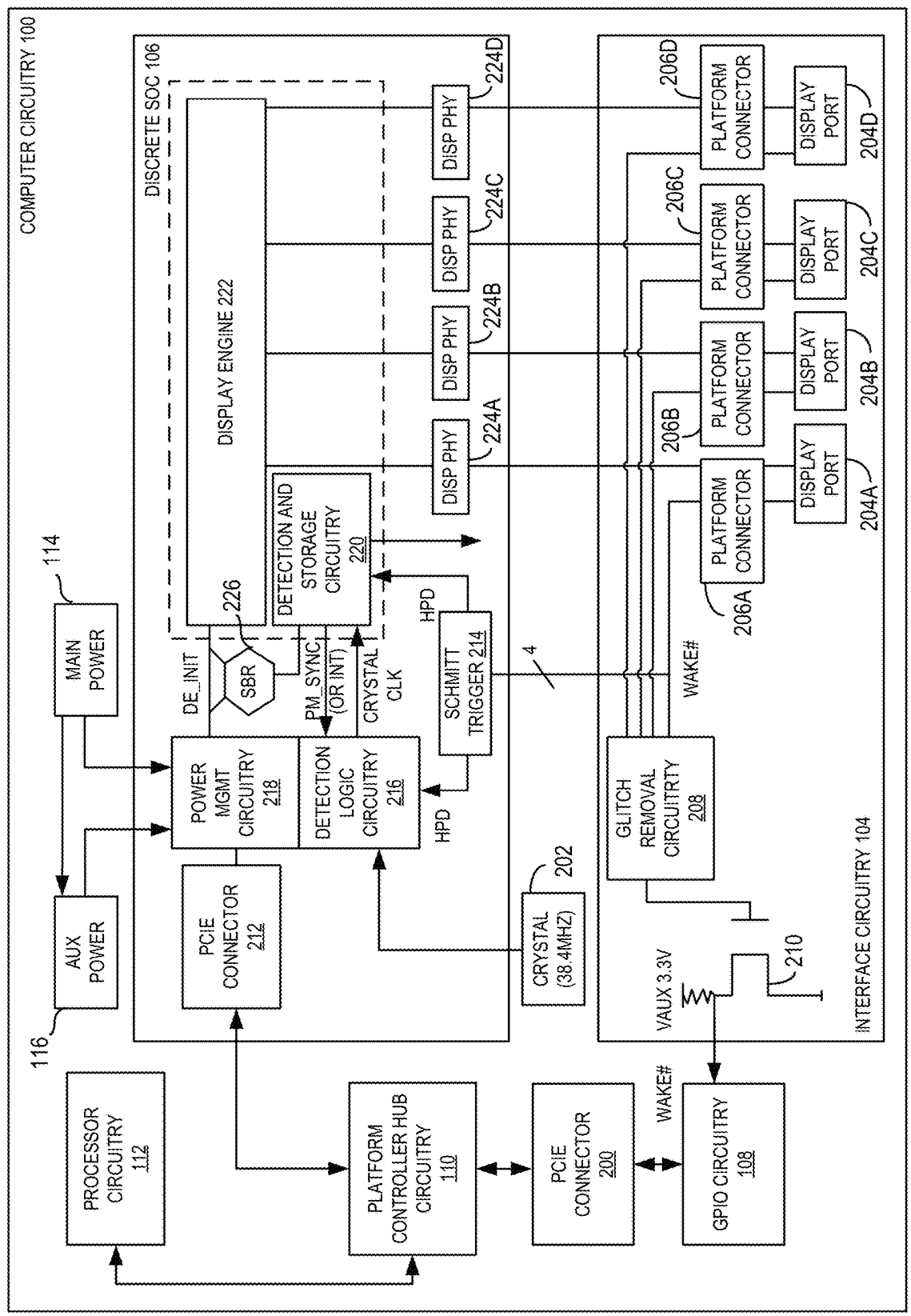
FIG. 2 is a block diagram of an example implementation of the discrete SoC and interface circuitry of FIG. 1.

FIG. 2 is a block diagram of an example implementation of the example discrete SoC 106 and the example interface circuitry 104 of FIG. 1. The example discrete SoC 106 of FIG. 1 may be instantiated (e.g., creating an instance of, bring into being for any length of time, materialize, implement, etc.) by processor circuitry such as a central processing unit executing instructions. Additionally or alternatively, the example discrete SoC 106 of FIG. 1 may be instantiated (e.g., creating an instance of, bring into being for any length of time, materialize, implement, etc.) by an ASIC or an FPGA structured to perform operations corresponding to the instructions.

It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor. Additionally, the example discrete SoC 106 may exhibit additional components or functionality not illustrated in FIG. 2. For example, FIG. 4, which is block diagram of an example implementation of the example discrete SoC 106, includes additional components not illustrated in the FIG. 2 block diagram of the example discrete SoC 106 for simplicity. Similarly, in FIG. 2, the example computer circuitry 100 includes an example PCIE connector 200, 212, and an example crystal 202 that are not illustrated in FIG. 1 for simplicity.

FIG. 2 includes the example interface circuitry 104, example discrete SoC 106, example GPIO circuitry 108, example Peripheral Component Interconnect Express (PCIE) connector 200, example platform controller hub circuitry 110, and example processor circuitry 112, and an example crystal 202. The example interface circuitry 104 includes display ports 204A, 204B, 204C, 204D, example platform connector circuitry 206A, 206B, 206C, 206D, example glitch removal circuitry 208, and an example transistor 210. The example discrete SoC 106 includes an example PCIE connector 212, an example Schmitt trigger 214, example detection logic circuitry 216, example power management circuitry 218, an example detection and storage circuitry 220, example display engine 222, example display PHY circuitry 224A, 224B, 224C, 224D, and an example side band router (SBR) 226.

The example display ports 204A, 204B, 204C, 204D, of the example interface circuitry 104 provide a physical connection between one or more displays (e.g., the display 102) and the example discrete SoC 106. The display ports 204A, 204B, 204C, 204D may connect to the display 102 using display protocols including but not limited to High Definition Multimedia Interface (HDMI™), Embedded Display Port (EDP), Video Graphics Array (VGA), Digital Visual Interface (DVI), etc. In some examples, a first display port 204A may use a first display protocol and a second display port 204B may use a second, different display protocol. While the illustrative FIG. 2 shows four display ports 204A, 204B, 204C, 204D for simplicity, the example discrete SoC 106 may support any number of display ports.

The example platform connector circuitry 206A, 206B, 206C, 206D of the example interface circuitry 104 connects the example discrete SoC 106 to the display ports 204A, 204B, 204C, 204D on the platform (i.e., implemented within the example computer circuitry 100). For example, if the display 102 is already connected to the display port 204A, the example discrete SoC 106 may send data to the example platform connector circuitry 206A via the display PHY circuitry 224A. In such examples, the example platform connector circuitry 206A may provide the data to the display port 204A, which causes an image update on the display 102.

In another example, if an HPD event occurs where the display 102 is connected to the display port 204B, the example platform connector circuitry 206B may detect the display 102 and generate a wake signal. In such examples, the example platform connector circuitry 206B may forward the wake signal to one or more of the glitch removal circuitry 208 and the Schmitt trigger 214. As used herein, a wake signal refers to an analog signal representative of one or more voltages on one or more display ports. The wake signal may indicate when the display 102 has been connected to one of the display ports 204A, 204B, 204C, 204D. In some examples, the wake signal may be an active low signal where a new display connection is represented using a low voltage (i.e., a digital '0').

The example glitch removal circuitry 208 receives the wake signal and filters the wake signal to remove voltage bouncing and other errors. Errors such as voltage bouncing may naturally occur in the wake signal when the display 102 is hot plugged into one of the display ports 204A, 204B, 204C, 204D. The output of the glitch removal circuitry is an idealized wake signal that accurately represents when a display is first connected to a display port. Further detail of an example of the glitch removal circuitry 208 is described below in connection with FIG. 3.

The transistor 210 of FIG. 2 receives the output of the glitch removal circuitry 208. In some examples, the transistor 210 may operate as an open drain (i.e., a current sink). As an open drain, the transistor 210 may provide a low voltage representative of a digital '0' to the example GPIO circuitry 108 in response to receiving a glitch free wake signal.

The PCIE connector 200 and PCIE connector 212 are both communication interface circuits that enable a compute resource to send and receive data with the example processor circuitry 112 via one or more PCIE protocols. For example, the PCIE connector 200 allows the example GPIO circuitry 108 to connect to the platform controller hub circuitry 110, and the PCIE connector 212 allows the example discrete SoC 106 to connect to the platform controller hub circuitry 110. A PCIE connector 200 may be integrated within the example computer circuitry 100, as illustrated in FIG. 2 in connection to the example GPIO circuitry 108. Additionally or alternatively, the PCIE connector 212 may be implemented on discrete circuitry, as illustrated in FIG. 2 within the example discrete SoC 106. Further detail of an example of the PCIE connector 212 is described below in connection with FIG. 4. In some examples, The PCIE connector 200 may implemented similarly to the PCIE connector 212 description in FIG. 4.

The Schmitt trigger 214 of the example discrete SoC 106 receives wake signals from the example platform connector circuitry 206A, 206B, 206C, 206D. The Schmitt trigger 214 may remove noise such as voltage bounces from a wake signal by only outputting a digital bit transition when the incoming analog wake signal transitions to be greater than or less than two separate voltage thresholds. The example Schmitt trigger 214 may provide an the digital output signal to the detection logic circuitry 216 and the detection and storage circuitry 220. Further detail of an example of the Schmitt trigger 214 is described below in connection with FIG. 3.

The detection logic circuitry 216 of the example discrete SoC 106 receives the output of the Schmitt trigger 214 and detects when a display connection occurs. The example detection logic circuitry 216 determines when a display connection occurs based on the digital output of the Schmitt trigger 214 and a clock signal provided by the crystal 202. The example detection logic circuitry 216 may implement an ungated Voltage Common Collector System Agent (VCCSA). VCSSA is a power supply that may continue to provide power to specific circuits of a compute resource (e.g., specific portions of the example discrete SoC 106) while the remaining circuits in the compute resource are powered off.

The crystal 202 of the example computer circuitry 100 provides a clock signal to the detection logic circuitry 216 to determine when a display connection occurs. In some examples, the crystal provides a 38.4 Mega Hertz (MHz) signal clock signal. In other examples, the crystal 202 provides a clock signal at a different frequency.

The example power management circuitry 218 of the example discrete SoC 106 communicates with the example processor circuitry 112 to control the power state of the example discrete SoC 106. For example, the example power management circuitry 218 may be notified by the detection logic circuitry 216 that a display connection has occurred. In response to the notification, the example power management circuitry may generate an interrupt that indicates the new display connection. The example power management circuitry 218 may provide the interrupt to the example processor circuitry 112 through the PCIE connector 212 and the platform controller hub circuitry 110. If the example discrete SoC 106 is in a D3 power state, the example processor circuitry 112 may, upon receiving the interrupt, execute instructions to bring the example discrete SoC 106 out of the D3 power state.

The example power management circuitry 218 of FIG. 2 also selects a power supply to provide power to one or more components of the example discrete SoC 106. The example power management circuitry 218 may select either the main power source 114 or the auxiliary power source 116, depending on the power state of the example discrete SoC 106.

The detection and storage circuitry 220 of the example discrete SoC 106 determines when a new display connection occurs. When a display connection occurs, the detection and storage circuitry 220 determines which of the display ports 204A, 204B, 204C, 204D the display 102 has been connected to and stores the information in memory. The detection and storage circuitry 220 may determine a display port by communicating with the example platform connector circuitry 206A, 206B, 206C, 206D via the example display engine 222.

The example display engine 222 of the example discrete SoC 106 executes instructions used to present graphics on the display 102. In some examples, the instructions executed by the example display engine 222 may be part of a software application referred to as a display driver interface (DDI). The example display engine 222 may be implemented in part by any form of processor circuitry described in connection with FIGS. 7, 8, 9. To present graphics on the display 102, the example display engine 222 communicates with the display 102 via one of the display PHY circuitry 224A, 224B, 224C, 224D. In some examples, the example display engine may be implemented as a virtual machine running on one or more processor resources of the example discrete SoC 106. Further detail of an example of the display engine 222 is described below in connection with FIG. 4.

The display PHY circuitry 224A, 224B, 224C, 224D of the example discrete SoC 106 implements functions corresponding to the physical layer of the Open Systems Interconnection (OSI) model. For example, a first given display PHY circuitry 224A may transmit data packets from the example display engine 222 to a first example platform connector circuitry 206A to cause a graphic to change on a previously connected display 102. In other examples, a second display PHY circuitry 224B may transmit data packets from the example display engine 222 to a second example platform connector circuitry 206B to initiate a device discovery protocol with a newly connected display 102. While four instances of the example display PHY circuitry 224A, 224B, 224C, 224D are illustrated in FIG. 2 for simplicity, the example computer circuitry 100 may implement any number of example display PHY circuitry instances. Further detail of an example of the device discovery protocol is described below in connection with FIGS. 4, 6.

The SBR 226 of FIG. 2 is a low speed communication interface that manages the transfer of low priority data between the display PHY circuitry 224A, 224B, 224C, 224D, and other discrete cards that may be connected to the example processor circuitry 112. By implementing the SBR 226 for low priority communication, the example discrete SoC 106 provides greater bandwidth for high priority data to be transferred to and from the example processor circuitry 112 at high speeds via either of the PCIE connector 200 or PCIE connector 212. Further detail of an example of the SBR 226 is described below in connection with FIG. 4.

The example discrete SoC 106 may switch sources of power based on its power state. For example, when in the D0 state, the example power management circuitry 218 may access a first amount of power from the main power source 114. In the D3hot state, however, the example processor circuitry 112 prevents the main power source 114 from providing the first amount of power to the example discrete SoC 106. As a result, the example power management circuitry 218 may access a second, smaller amount of power from the auxiliary power source 116 in the D3hot state.

The first amount of power from the graphics card may be considered full power and is used for the example discrete SoC 106 to perform all of its normal functions. The second amount of power, in contrast, may only provide enough current to power the PCIE connector 212, Schmitt trigger 214, detection logic circuitry 216, and example power management circuitry 218, which are collectively responsible for detecting a wake signal and sending an interrupt to the example processor circuitry 112. In some examples, The PCIE connector 212, Schmitt trigger 214, detection logic circuitry 216, and example power management circuitry 218 may be referred to as a power island because they remain powered on during a D3hot state while the rest of the example discrete SoC 106 is powered off Although the power island enables support of HPD events in the D3hot state, the example discrete SoC 106 does not receive any power in a D3cold state and is therefore unable to enable the power island in such examples. Instead, the transistor 210 in the example interface circuitry 104 may send a glitch free wake signal to the example GPIO circuitry 108 when the example discrete SoC 106 is in the D3cold state. The example GPIO circuitry 108, in turn, is programmed to register the wake signal and send an interrupt to the example processor circuitry 112 using Advanced Configuration and Power Interface (ACPI) routines. ACPI refers to a standardized communication protocol used by operating systems to manage power, configure, and monitor the status of hardware components.

Once the example processor circuitry 112 is notified of the HPD event via an interrupt from one of the example GPIO circuitry 108 or example discrete SoC 106, the example processor circuitry 112 wakes the example discrete SoC 106 from either the D3hot or D3cold state. As used herein, waking a discrete device refers to moving the discrete device from a low power state (i.e., either of the D3 power states) to the D0 power state. With full power, the example discrete SoC 106 is able to initiate a device discovery protocol. After the device discovery protocol is complete, the display 102 may be considered fully connected and can be used for normal operation.

The use of the auxiliary power source 116 and example interface circuitry 104 allow the example computer circuitry 100 to detect a HPD event, notify the example processor circuitry 112, and automatically connect the display 102 after the HPD event, even when the example discrete SoC 106 is in a D3 power state. This removes the need for an external event to initiate a device connection and reduces latency in the user experience.

In some examples, a HPD event may occur when the example computer circuitry 100 is in a S3, S4, or S5 state. In such examples, the example interface circuitry 104 may lose access to a full amount of power from the main power source 114 but may still have access to a secondary amount of power from the auxiliary power source 116. As a result, the example interface circuitry 104 is able to detect the HPD event and generate an interrupt to wake the example processor circuitry 112. Once in a full power state, the example processor circuitry 112 may send instructions to the main power source 114 to wake other compute resources such as the example discrete SoC 106. After the example discrete SoC 106 is awake, the example discrete SoC 106 may initiate a device protocol to complete connection of the display 102 as described previously.

Figure 3:
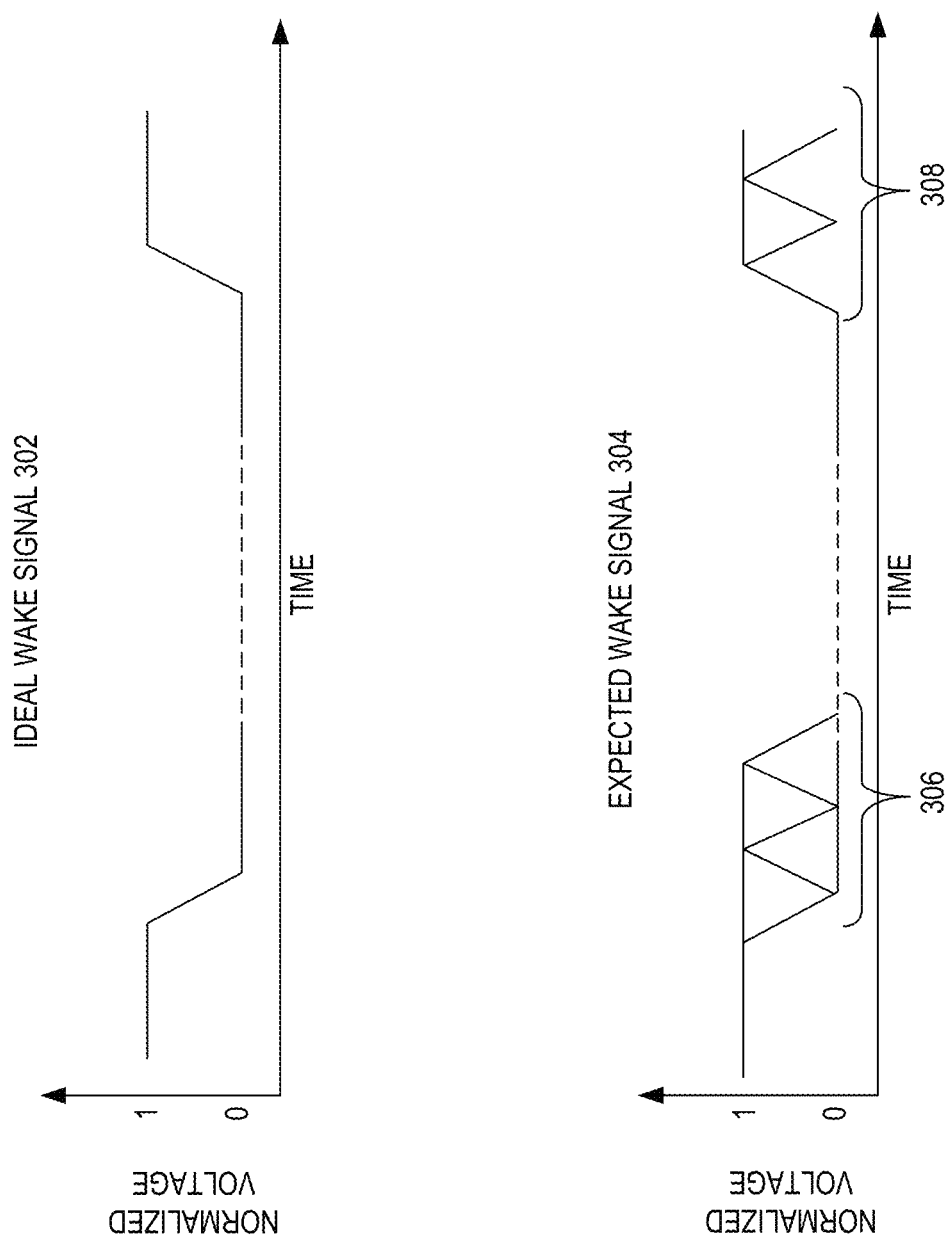
FIG. 3 is an illustrative example of glitches in a wake signal.

FIG. 3 is an illustrative example of glitches in a wake signal. FIG. 3 includes an ideal wake signal 302 and an expected wake signal 304. The expected wake signal 304 includes first glitches 306 and second glitches 308.

The ideal wake signal 302 and expected wake signal 304 share identical axes. The x axes of the wake signals represent time. They axes of the wake signals represent a normalized voltage of the wake signal. The voltage is normalized so that a high supply voltage used to represent a digital '1' bit in the wake signal is shown on the y axes as 1 V, regardless of the actual analog value of the high supply voltage. Similarly, a low supply voltage used to represent a digital '0' bit in the wake signal is shown on the y axes as 0 V, regardless of the actual analog value of the low supply voltage. Both the ideal wake signal 302 and expected wake signal 304 are active low signals, which means 1 V indicates the display 102 is not connected and 0 V indicates the display is connected.

The ideal wake signal 302 transitions between voltages without any of the first glitches 306 or second glitches 308. As a result, the ideal wake signal 302 accurately indicates whether the display 102 is connected to a particular display port 204A at every point in time.

Manufacturers may design the display port 204A, display 102, and physical medium (e.g., a cable) such that the example platform connector circuitry 206A, 206B, 206C, 206D can produce the ideal wake signal 302. In practice, however, imperfections or errors in any of the foregoing hardware components may result in the example platform connector circuitry 206A, 206B, 206C, 206 producing a wake signal similar to the expected wake signal 304.

In the expected wake signal 304, a HPD event causes the first glitches 306, and a disconnection of the display 102 from the example computer circuitry 100 causes the second glitches 308. During the time span when the first glitches 306 and second glitches 308 occur, the expected wake signal 304 may erroneously transition between the high supply voltage, low voltage, and any other voltage. In some examples, the first glitches 306 and second glitches 308 may be referred to as noise, voltage bounce, etc. As a result of the first glitches 306 and second glitches 308, the expected wake signal 304 does not accurately indicate whether the display 102 is connected to a particular display port 204A.

If the expected wake signal 304 was used directly by the example power management circuitry 218 or example GPIO circuitry 108, the respective circuitry may be unable to accurately produce interrupts that describe the state of the display 102. The faulty interrupts may cause errors that prevent further connection and/or produce unexpected behavior. Therefore, the Schmitt trigger 214 filters the actual wake signal sent by the example platform connector circuitry 206A, 206B, 206C, 206 to better match the ideal wake signal 302 when in the D3hot state. Similarly, the glitch removal circuitry 208 filters the actual wake signal when in the D3cold state.

Figure 4:
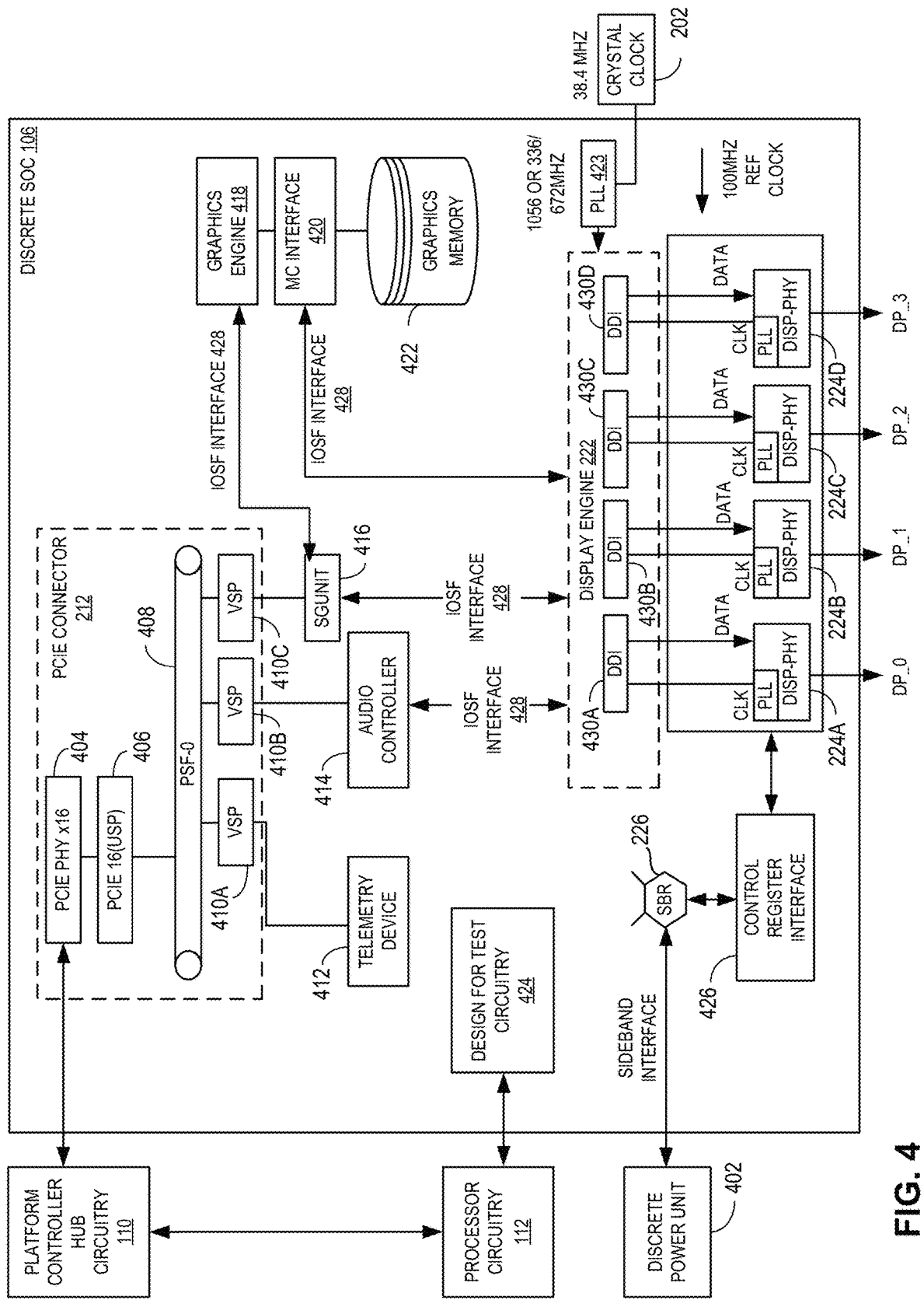
FIG. 4 is a block diagram of an example implementation of the discrete graphics System on a Chip (SoC) of FIG. 1

FIG. 4 is a block diagram of an example implementation of the example discrete SoC 106 of FIG. 1. FIG. 4 includes a discrete power unit 402, the example platform controller hub circuitry 110, the example processor circuitry 112, and the example discrete SoC 106. The example discrete SoC 106 includes the example PCIE connector 212, an example telemetry device 412, an example audio controller 414, an example systems graphic unit (SGUNIT) 416, the example display engine 222, example graphics engine 418, Memory Controller (MC) Interface 420, graphics memory 422, example Phase Locked Loop (PLL) 423, the example display PHY circuitry 224A, 224B, 224C, 224D, example design for test circuitry 424, the example SBR 226, example control register interface circuitry 426, and example Input Output Scalable Fabric (IOSF) interface 428. The example PCIE connector 212 includes PCIE PHY circuitry 404, PCIE Upstream Switch Port (USP) circuitry 406, Primary Scalable Fabric (PSF) circuitry 408, Virtual Switch Port (VSP) circuitry 410A, 410B, 410C. The example display engine 222 includes respective example DDI applications 430A, 430B, 430C, 430D for each display PHY circuitry 224A, 224B, 224C, 224D.

FIG. 4 may include some components of the example discrete SoC 106 that were not illustrated in FIG. 2 for simplicity. Similarly, some components illustrated within FIG. 2 of the example discrete SoC 106 may not be illustrated in FIG. 4 for simplicity. However, in practice, the example discrete SoC 106 may be implemented with components from both FIG. 2 and FIG. 4.

The example PCIE PHY circuitry 404 of the PCIE connector 212 is an implementation of the physical layer of the OSI model. For example, the PCIE PHY circuitry 404 implements the physical connections needed for the example power management circuitry 218 to send an interrupt to the platform controller hub circuitry 110 using a PCIE protocol. The PCIE PHY circuitry 404 may also be used to send data from the example processor circuitry 112 to the example discrete SoC 106 using a PCIE protocol.

The example PCIE USP circuitry 406 of the PCIE connector 212 connects devices one or more downstream devices using the PCIE protocol to the example processor circuitry 112. A downstream device may refer to a compute resource that uses the PCIE protocol and is not the example processor circuitry 112. Similarly, the example PCIE USP circuitry 406 is considered upstream because it is closer to the example processor circuitry 112 than a downstream switch.

The PSF circuitry 408 of the PCIE connector 212 is a high bandwidth bus for PCIE compliant messages. The PSF circuitry 408 may be implemented by network, computing, and storage nodes that may resemble a fabric when viewed collectively.

The VSP circuitry 410A, 410B, 410C of the PCIE connector 212 allows virtual machines to communicate with other compute resources using the PCIE protocols and PSF circuitry 408. In some examples, the VSP circuitry 410A, 410B, 410C may be referred to as downstream switch ports. While three VSP circuitry 410A, 410B, 410C instances are illustrated in FIG. 4, the PCIE connector may support additional circuitry VSP circuitry instances based on the bandwidth of the PSF circuitry 408.

The example telemetry device 412 and the example audio controller 414 are virtual machines that implement additional functionality on the example discrete SoC 106 other than graphics. For example, the audio controller 414 may process audio signals that correspond to the graphics shown on the display 102. The telemetry device 412 may measure performance metrics of the example discrete SoC 106 and provide the metrics to other compute resources. Both the example telemetry device 412 and the example audio controller 414 may use a respective switch (i.e., VSP circuitry 410A for telemetry device and VSP circuitry 410B for the audio controller) to send and receive messages with other compute resources using the PCIE protocol.

The system graphics unit 416 is a virtual machine that communicates with the example processor circuitry 112 regarding graphics. For example, after receiving a command to update a graphic, The system graphics unit 416 may send the command to one of the example display engine 222 or the example graphics engine 418. The system graphics unit 416 may send the command to a particular engine based on the contents of the message. The system graphics unit 416 may communicate with a particular engine using the IOSF Interface 428 and a communication standard such as Open Core Protocol (OCP) or Advanced Extensible Interface (AXI).

The IOSF interface 428 is a collection of hardware components on the example discrete SoC 106 that enable communication between various resources on the example discrete SoC 106. For example, the IOSF interface may be used for one or more virtual machines to transfer data between one another. The IOSF may be implemented by network, computing, and storage nodes that may resemble a fabric when viewed collectively.

The example graphics engine 418 is a processor resource that is designed to efficiently compute graphics. For example, the example graphics engine 418 may be able to alter memory at a faster rate than other types of processors to support the creation of image frames in a buffer (i.e., graphics). The example graphics engine 418 may compute graphics based on instructions from the example processor circuitry 112 that it receives via the PCIE connector 212 and system graphics unit 416. To compute graphics, the example graphics engine 418 may execute instructions that are part of software application known as a graphics driver. In some examples, the graphics driver and/or example graphics engine 418 may be implemented as a virtual machine running on one or more processor resources of the example discrete SoC 106.

The graphics driver may receive instructions to initiate a device discovery protocol. In a device discovery protocol, graphics engine 418 may cause the example display engine 222 to determine which of the display ports 204A, 204B, 204C, 204D, produced the HPD. Once a specific display port (e.g., display port 224C) is identified, the display engine 222 may communicate with the newly connected display 102 to determine additional performance parameters such as resolution and refresh rate. The example display engine 222 can then provide the performance parameters to the example processor circuitry 112 via the PCIE connector 212. Once the performance parameters are received at the example processor circuitry 112, the display 102 may be considered fully connected and can be used for normal operation.

The example MC interface circuitry 420 controls the storage and retrieval of data from the graphics memory 422. For example, the MC interface circuitry 420 may receive a request for data from the example graphics engine 418 and provide the data to the example graphics engine 418. The MC interface circuitry 420 may also receive new or altered data from the example graphics engine 418 and update the graphics memory 422 appropriately. Similarly, the MC interface circuitry 420 may provide data to and receive data from the example display engine 222. In some examples, communication between the example display engine 222 and MC interface circuitry 420 may occur over the IOSF interface 428. In some examples, the communication may be referred to as isochronous. In such examples, transmission between the MC interface circuitry 420 may occur at regular intervals with a fixed gap between data packets.

The graphics memory 422 refers to a portion of the memory resources on the example discrete SoC 106 that are used exclusively to hold graphics data. While not illustrated in FIG. 4 for simplicity, other portions of the memory resources on the example discrete SoC 106 may support other functionality such as the telemetry device 412 or audio controller 414. The graphics memory 422 may implement Double Date Rate (DDR). DDR refers to a type of memory which responds to control inputs on both the falling and rising edge of a clock signal. Through this manner, the graphics memory 422 may support faster transmission of data than other forms of memory. In other examples, however, the graphics memory 422 may be implemented by any form of memory. For example, the graphics memory 422 may be implemented by the volatile memory 714 or non-volatile memory 716 of FIG. 7.

The example display engine 222 implements example DDI applications 430A, 430B, 430C, 430D to cause images to be presented on the display 102. The example DDI applications 430A, 430B, 430C, 430D may receive commands and data using the IO scalable fabric, display interface, and/or isochronous interface, depending on the source of the commands or data. After receiving commands and/or data, the example DDI applications 430A, 430B, 430C, 430D may generate signals with voltage, current, and timing parameters to make the display show the desired text or image. In some examples, the example DDI applications 430A, 430B, 430C, 430D may be collectively referred to as a device driver.

The PLL 423 receives a first clock signal from the crystal and forms a second clock signal with a higher frequency. In some examples, the second clock signal may be 336 MHz, 672 MHz, or 1056 MHz. In other examples, the second clock signal is a different frequency.

The display PHY circuitry 224A, 224B, 224C, 224D implements the physical layer of the OSI model for display ports as described previously in FIG. 2. The display PHY circuitry 224A, 224B, 224C, 224D implement PLLs to receive a clock signal from the respective example DDI applications 430A, 430B, 430C, 430D and produce the required clock signal for a given display. The PLLs of the display PHY circuitry 224A, 224B, 224C, 224D may also use a reference clock signal to produce the proper input clock signal. In some examples, the reference clock signal is 100 MHz.

The design for test circuitry 424 implements tests that allow designers, manufacturers, etc. to verify the example discrete SoC 106 functions as intended. For example, the design for test circuitry 424 may implement a Test Access Port (TAP), In Die Variation (IDV) chains, a scan controller, a Memory Built In Self-Test (MBIST), etc. The design for test circuitry 424 may receive commands to perform a given test from the example processor circuitry 112. In some examples, the design for test circuitry 424 may additionally or alternatively communicate with the example processor circuitry 112 via the platform controller hub circuitry 110. Once a given test is complete, the design for test circuitry 424 may send the results to the example processor circuitry 112.

The discrete power unit 402 is an amount of power provided by an additional discrete circuit within the example computer circuitry 100. The discrete power unit 402 powers the SBR 226, which allows for low priority communication of data between the display PHY circuitry 224A, 224B, 224C, 224D and the example processor circuitry 112 as described previously.

The example control register interface circuitry 426 connects the SBR 226 to one or more control registers corresponding to the display PHY circuitry 224A, 224B, 224C, 224D. As used herein, a control register refers to a specific address in graphics memory 422 that is used to manage the operation of the example discrete SoC 106. The example control register interface circuitry 426 enables the configuration of the display PHY circuitry 224A, 224B, 224C, 224D to enable the transmission of various forms of low priority data.

The example block diagram of FIG. 4 can be used to illustrate the functions of the example discrete SoC 106 after a HPD event causes the example processor circuitry 112 to wake the example discrete SoC 106 from either a D3hot state or D3cold state after a HPD event. For example, once in a D0 state, the example power management circuitry 218, systems graphics unit 416, and example PCIE USP circuitry 406 may work to register the HPD event. Once registered, the example power management circuitry 218 may notify the example display engine 222 of the HPD event. In response, the example display engine 222 may notify the example processor circuitry 112 of the HPD event. Once notified of the HPD event, the example processor circuitry 112 may instruct the graphics driver running on the example graphics engine to initiate the device discovery protocol, which completes the display connection process.

The example discrete SoC 106 can perform the foregoing functions because it is automatically woken from either the D3hot or D3cold state, as described previously in reference to FIG. 2. The automatic wake removes the need for an external event to wake the example discrete SoC 106 and therefore reduces lag in the user experience.

While an example manner of implementing the example computer circuitry 100 of FIG. 1 is illustrated in FIGS. 2, 4, one or more of the elements, processes, and/or devices illustrated in FIGS. 2, 4 may be combined, divided, rearranged, omitted, eliminated, and/or implemented in any other way. Further, the example interface circuitry 104, the example discrete SoC 106, example GPIO circuitry 108, example platform controller hub circuitry 110, example processor circuitry 112, example main power source 114, example auxiliary power source 116, and/or, more generally, the example computer circuitry 100 of FIG. 1, may be implemented by hardware alone or by hardware in combination with software and/or firmware. Thus, for example, any of the example interface circuitry 104, the example discrete SoC 106, example GPIO circuitry 108, example platform controller hub circuitry 110, example processor circuitry 112, example main power source 114, example auxiliary power source 116, and/or, more generally, the example computer circuitry 100 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example computer circuitry 100 of FIG. 1 may include one or more elements, processes, and/or devices in addition to, or instead of, those illustrated in FIG. 1, and/or may include more than one of any or all of the illustrated elements, processes and devices.

Figure 5:
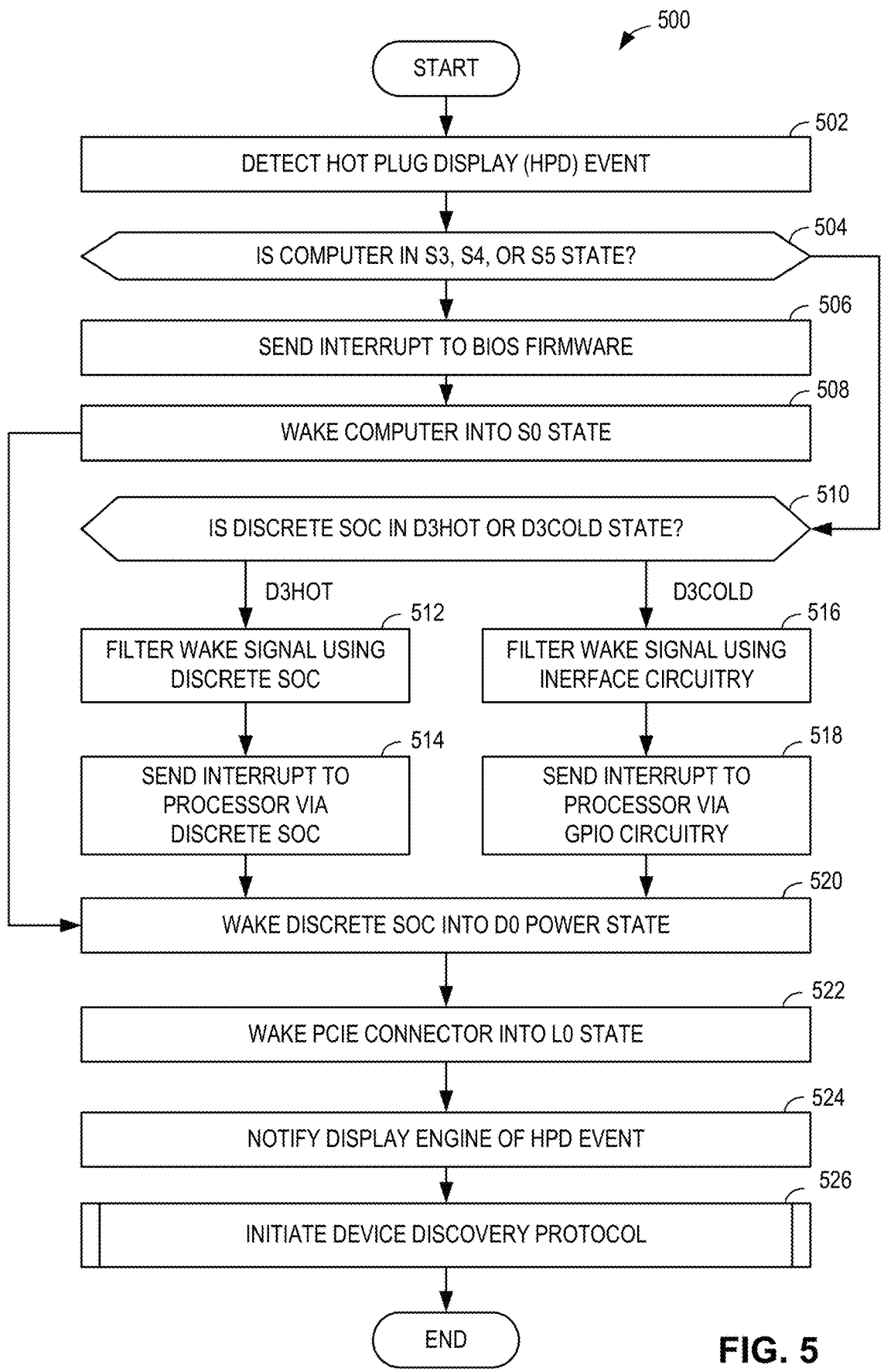
FIG. 5 is a flowchart representative of example machine readable instructions and/or example operations that may be executed by computer circuitry to wake a display.
Figure 6:
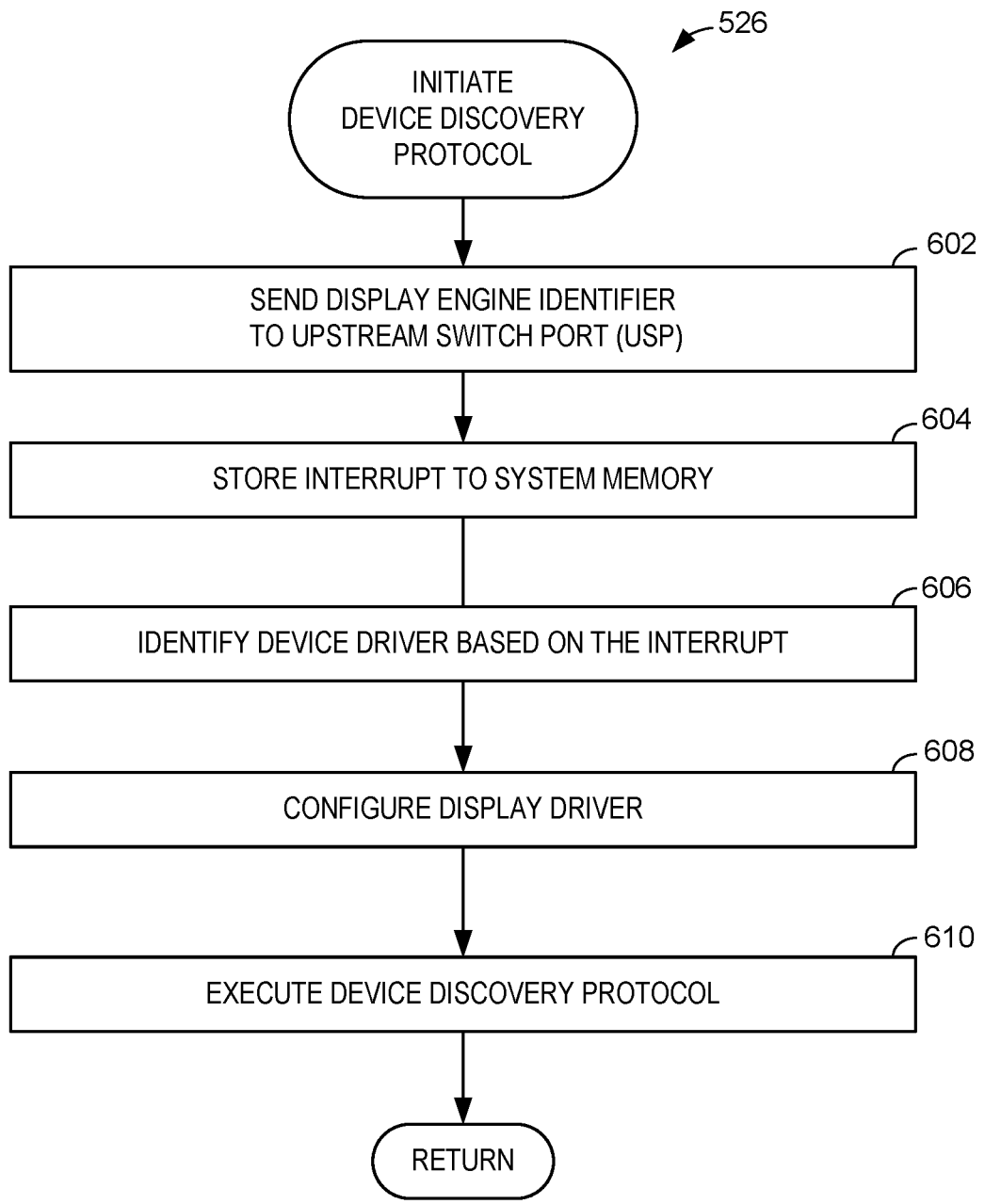
FIG. 6 is a flowchart representative of example machine readable instructions and/or example operations that may be executed by the computer circuitry to initiate a device discovery protocol as described in FIG. 5.

A flowchart representative of example hardware logic circuitry, machine readable instructions, hardware implemented state machines, and/or any combination thereof for implementing the example computer circuitry 100 of FIG. 1 is shown in FIGS. 5, 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5, 6, many other methods of implementing the example computer circuitry 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5, 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by the example computer circuitry 100 to automatically connect a display from a D3 power state. The example machine readable instructions and/or the operations 500 of FIG. 5 begin when one of the example platform connector circuitry 206A, 206B, 206C, 206D detects a HPD event. (Block 502). An HPD event occurs when a user connects the display 102 to any of the display ports 204A, 204B, 204C, 204D. The responsible instance (e.g., example platform connector circuitry 206D) may generate a wake signal in response to detecting the HPD event.

The example interface circuitry 104 determines whether the example computer circuitry 100 is in a S3, S4, or S5 power state. (Block 504). In the S3, S4, or S5 power state, the example processor circuitry 112 may lack the power to properly respond to an HPD event. If the example computer circuitry 100 is not in the S3, S4, or S5 power state, the example machine readable instructions and/or the operations 500 proceed to block 510.

If the example computer circuitry 100 is in any of the S3, S4, or S5 power states, the example interface circuitry 104 sends an interrupt to Basic Input Output Systems (BIOS) firmware. (Block 506). The example interface circuitry 104 may use power from the auxiliary power source 116 to send an interrupt while the example computer circuitry 100 is in any of the S3, S4, or S5 power states. The BIOS firmware may be implemented by circuitry that continues to receive some amount of power while in the S3, S4, or S5 power state.

The BIOS firmware wakes the example computer circuitry 100 into the S0 state. (Block 508). In the S0 state, the example processor circuitry 112 has full power and can respond to the HPD event properly.

The example processor circuitry 112 determines whether the example discrete SoC 106 is in the D3hot power state or D3cold power state. (Block 510). The example processor circuitry 112 determines the power state of the example discrete SoC 106 to determine which compute resource is responsible for responding to the HPD event.

If the example discrete SoC 106 is in the D3hot power state, the example discrete SoC 106 filters a wake signal. (Block 512). Specifically, the example discrete SoC 106 accesses the auxiliary power source 116 to enable a power island as described in connection with FIG. 2. The power island includes a Schmitt trigger 214, which uses hysteresis to remove glitches from the wake signal as described in connection with FIG. 2.

After filtering the wake signal, the example discrete SoC 106 sends an interrupt to the processor. (Block 514). Specifically, the filtered wake signal is processed by the detection logic circuitry 216, which notifies the example power management circuitry 218. The example power management circuitry 218 then generates an interrupt via the PCIE connector 200 and the platform controller hub circuitry 110. The interrupt may request that the example discrete SoC 106 enter a D0 power state. The example machine readable instructions and/or operations 500 proceed to block 520 after block 514.

If the example discrete SoC 106 is in the D3cold state, the example interface circuitry 104 filters the wake signal. (Block 516). Specifically, the glitch removal circuitry 208 may implement one or more filters to remove glitches as described in connection with FIG. 3. The example interface circuitry 104 filters the wake signal when the example discrete SoC 106 is in the D3cold state because the example discrete SoC 106 does not receive power in the D3cold state and is therefore unable to process the HPD event.

After filtering the wake signal, the example GPIO circuitry 108 sends an interrupt to the example processor circuitry 112 (Block 518). The example GPIO circuitry 108 is notified of the HPD event by a transistor 210 that changes one or more values on a GPIO pin. The example GPIO circuitry 108 may send an interrupt to the example processor circuitry 112 via the PCIE connector 212 and the platform controller hub circuitry 110. The interrupt may use ACPI routines to request that the example discrete SoC 106 enter a D0 power state. The example machine readable instructions and/or operations 500 proceed to block 520 after block 518.

The example processor circuitry 112 wakes the example discrete SoC 106 into a D0 power state. (Block 520). The example processor circuitry 112 may wake the example discrete SoC 106 in response to receiving an interrupt from either the example discrete SoC 106 or example GPIO circuitry 108. The example processor circuitry 112 may wake the example discrete SoC 106 by communicating with the main power source 114 to allow the example discrete SoC 106 to receive the first amount of power (i.e., full power).

Once in the D0 power state, the example discrete SoC 106 wakes the PCIE connector 212 into an L0 state (Block 522). An L0 state is a variable used by PCIE Active State Power Management (ASPM), a standard used to manage the power consumption of PCIE connectors. The example discrete SoC 106 converts the link state of the PCIE connector 212 from L1 (off) to L0 (on) when data transfer begins.

The example power management circuitry 218 notifies the example display engine 222 of the HPD event. (Block 524). To notify the example display engine 222, the example power management circuitry 218 may send a first message to initialize communication with the example display engine 222. The example power management circuitry 218 may then send a second message that requests the example display engine 222 respond to the HPD event. Finally, the example display engine 222 may send a third message to the example power management circuitry 218 to acknowledge receipt of the request.

The example display engine 222 initiates a device discovery protocol. (Block 526). To initiate the device discovery protocol, the example display engine 222 may send one or more interrupts to the example processor circuitry 112. Once the device discovery protocol is complete, the display 102 is fully connected and the example machine readable instructions and/or operations 500 end. Further detail of an the example machine readable instructions and/or operations 500 used to implement block 526 are described below in connection with FIG. 6.

FIG. 6 is a flowchart representative of example machine readable instructions and/or example operations that may be executed by the example computer circuitry 100 to initiate a device discovery protocol as described in FIG. 5. Specifically, FIG. 6 shows how the example machine readable instructions and/or operations 500 execute block 526.

The example display engine 222 sends an identification number used to identify the example display engine 222 to the example PCIE USP circuitry 406. (Block 602). To send the identification number to the USP, the example display engine 222 may first send an interrupt to the system graphics unit 416 using the IOSF interface 428. The system graphics unit 416 may then forward the interrupt to the example PCIE USP circuitry 406 via the VSP circuitry 410C and the PSF circuitry 408.

In some examples, the interrupt of block 602 may be implemented as a Message Single Interrupt (MSI). An MSI is a type of interrupt that is sent over a communication channel that is used primarily for other purposes. MSIs serve as alternatives to communication networks that use a dedicated channel for interrupts.

The example computer circuitry 100 stores the interrupt in system memory. (Block 604). To store the interrupt, the example PCIE USP circuitry 406 may forward the interrupt to the platform controller hub circuitry 110 via the PCIE PHY circuitry 404. In turn, the platform controller hub circuitry 110 may then provide the interrupt to a memory controller that stores the data into system memory. The system memory may be implemented by any type of memory. For example, the system memory may be implemented by the volatile memory 714 or non-volatile memory 716 of FIG. 7.

The example processor circuitry 112 identifies the example display engine 222 based on the interrupt. (Block 606). Specifically, the example processor circuitry 112 uses the identification number in the interrupt to determine that example discrete SoC 106 was woken into the D0 state at block 520, because of the example display engine 222. Prior to block 606, the example processor circuitry 112 may have woken the example discrete SoC 106 without knowing an HPD event initiated the wake. This is because, in some examples, other compute resources on the example discrete SoC 106 (e.g., the telemetry device 412, the audio controller 414, etc.) may additionally be able to request the processor circuitry wake the example discrete SoC 106 into the D0 power state.

In response to identifying the example display engine 222, the example processor circuitry 112 configures the display driver. (Block 608). To configure the display driver, the example processor circuitry 112 may send instructions to the example graphics engine 418 via the PCIE connector 212, system graphic unit 416, and IOSF interface 428. In turn, the example graphics engine 418 may send configuration parameters to the example display engine 222. The configuration parameters may include information such as, but not limited to, which of the display ports 204A, 204B, 204C, 204D, if any, already had a connected display before the example discrete SoC 106 entered the D3 state. The example graphics engine 418 may use the MC interface circuitry 420 to access the graphics memory 422 when providing configuration parameters.

Using the configuration parameters, the example display engine 222 executes a device display discovery protocol. (Block 610). In the display discovery protocol, the example display engine 222 executes instructions to determine which of the display ports 204A, 204B, 204C, 204D produced the HPD event. The example display engine 222 may also determine additional performance parameters of the display 102 such as resolution and refresh rate. The example machine readable instructions and/or operations 500 end after block 610. In some examples, the instructions used to initiate a discovery protocol are some or all of the instructions executed by the example display engine 222 to implement the example DDI applications 430A, 430B, 430C, 430D.

Figure 7:
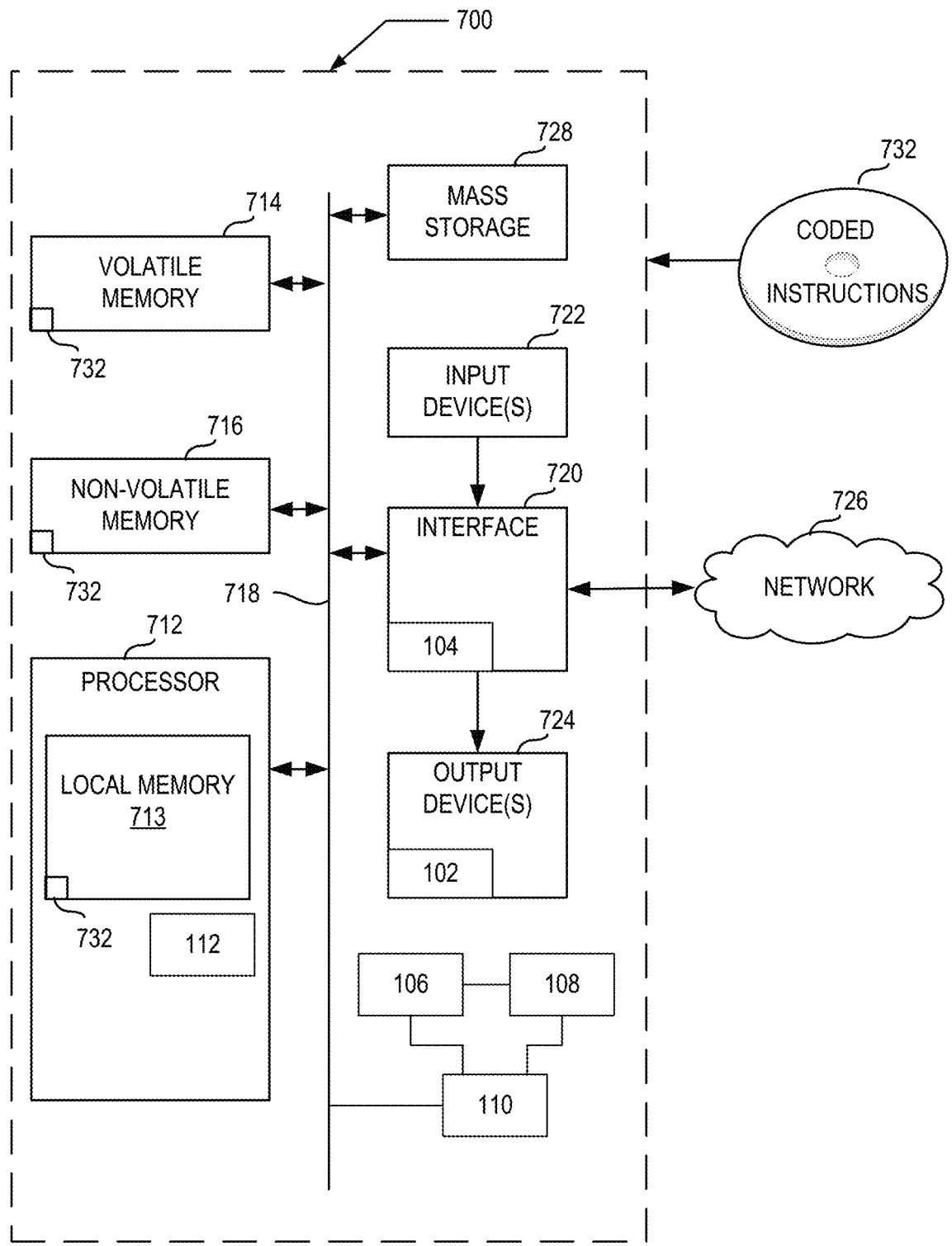
FIG. 7 is a block diagram of an example processing platform including processor circuitry structured to execute the example machine readable instructions and/or the example operations of FIGS. 5-6 to implement the example computer circuitry of FIG. 1.

FIG. 7 is a block diagram of an example processor platform 700 structured to execute and/or instantiate the machine readable instructions and/or the operations 500 of FIGS. 5, 6 to implement the example computer circuitry 100 of FIG. 1 The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example processor circuitry 112.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller.

The processor platform 700 of the illustrated example also includes example interface circuitry 720. The example interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the example interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the example interface circuitry 720 of the illustrated example. The output device(s) 724 can be implemented, for example, by the display 102 (which may be implemented as a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The example interface circuitry 720 of the illustrated example, thus, typically includes a graphics driver card, a graphics driver chip, and/or graphics processor circuitry such as a GPU.

The example interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 732, which may be implemented by the machine readable instructions of FIGS. 5, 6, may be stored in the mass storage device 728, in the volatile memory 714, in the non-volatile memory 716, and/or on a removable non-transitory computer readable storage medium such as a CD or DVD.

Figure 8:
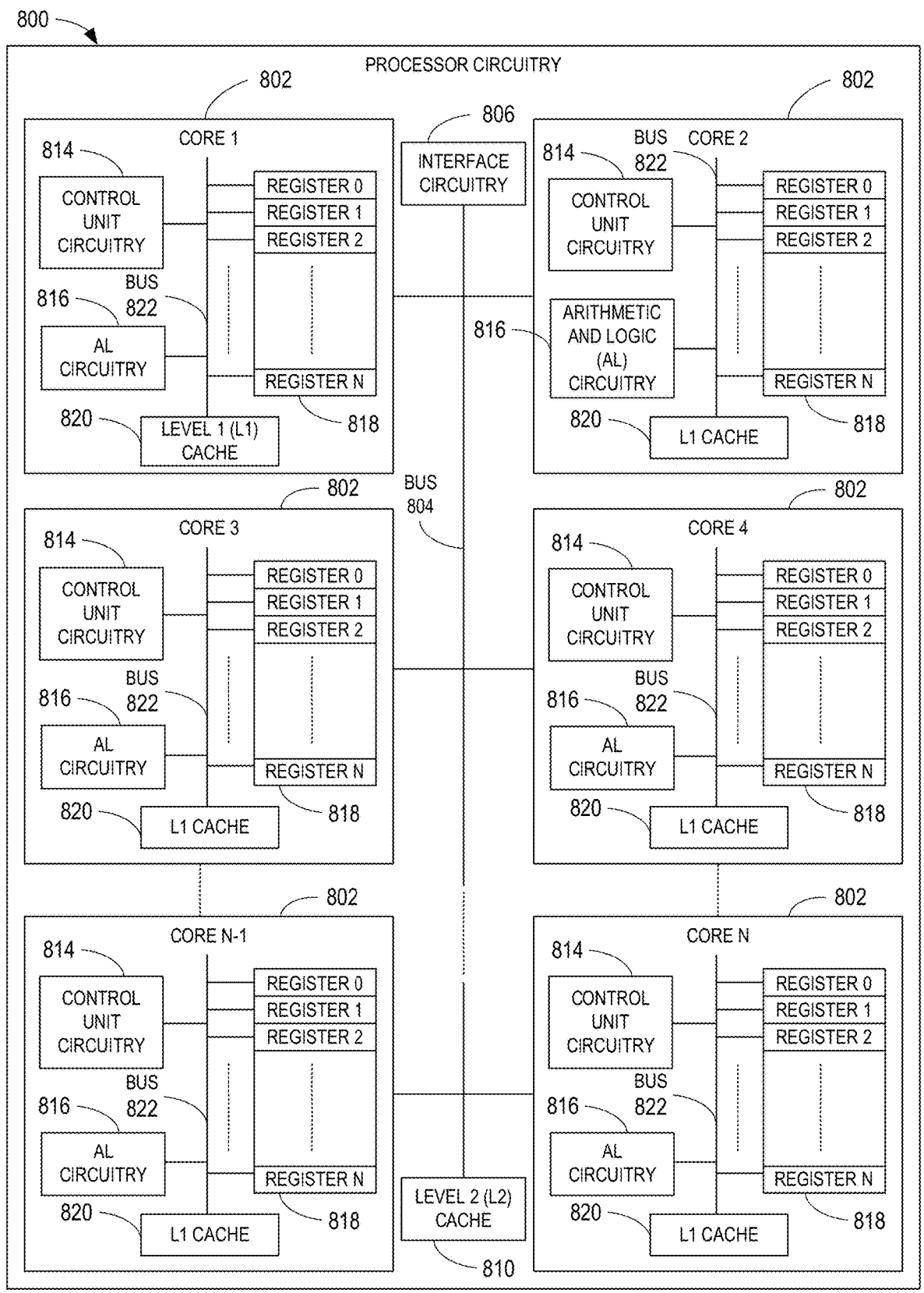
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a general purpose microprocessor 800. The general purpose microprocessor circuitry 800 executes some or all of the machine readable instructions of the flowcharts of FIGS. 5, 6 to effectively instantiate the example computer circuitry 100 of FIG. 1 as logic circuits to perform the operations corresponding to those machine readable instructions. In some such examples, the example computer circuitry 100 is instantiated by the hardware circuits of the microprocessor 800 in combination with the instructions. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 5, 6.

The cores 802 may communicate by a first example bus 804. In some examples, the first bus 804 may implement a communication bus to effectuate communication associated with one(s) of the cores 802. For example, the first bus 804 may implement at least one of an Inter-Integrated Circuit (I2C) bus, a Serial Peripheral Interface (SPI) bus, a PCI bus, or a PCIe bus. Additionally or alternatively, the first bus 804 may implement any other type of computing or electrical bus. The cores 802 may obtain data, instructions, and/or signals from one or more external devices by example interface circuitry 806. The cores 802 may output data, instructions, and/or signals to the one or more external devices by the example interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
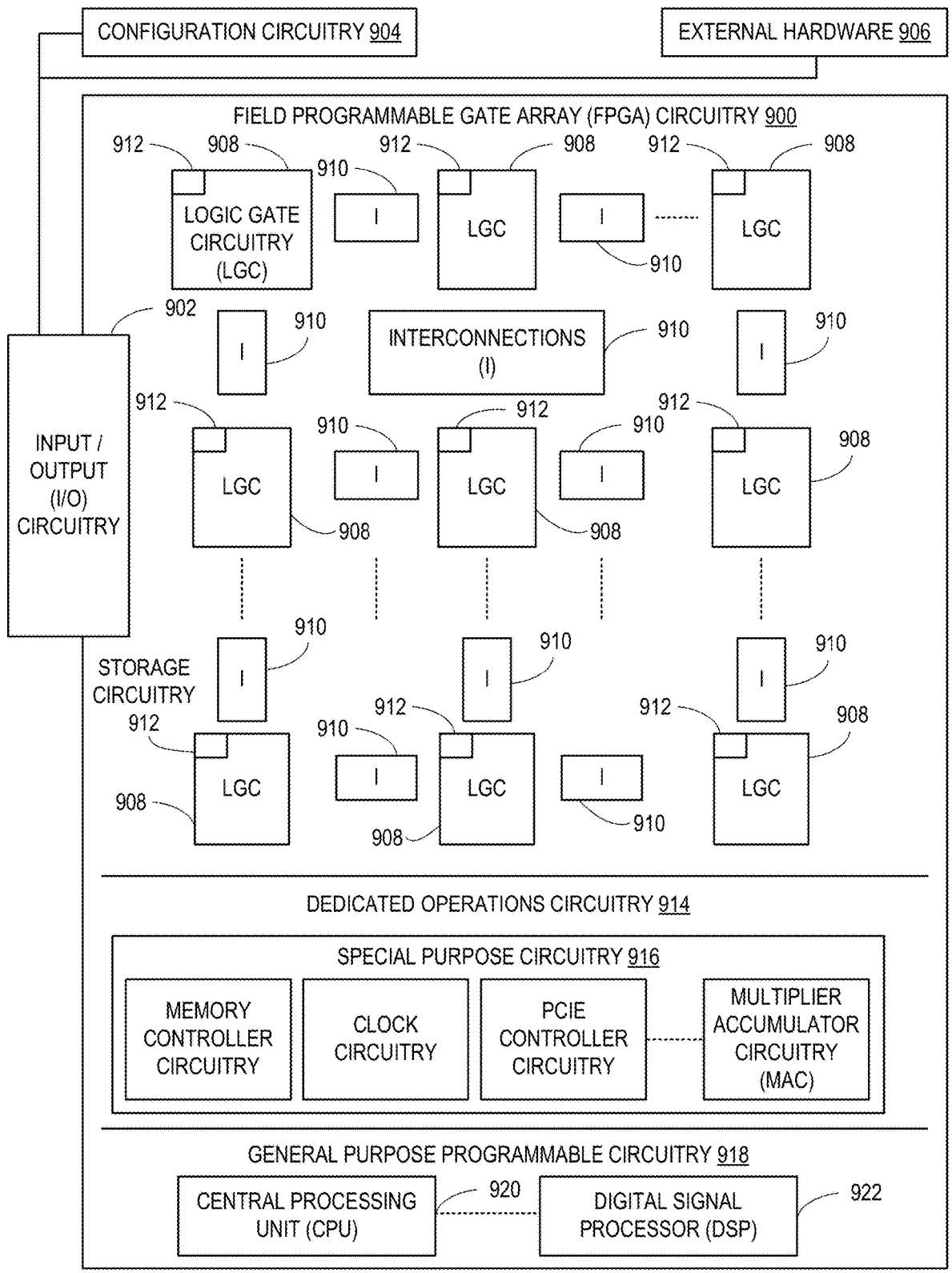
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 5, 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 5, 6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 5, 6. As such, the FPGA circuitry 900 may be structured to effectively instantiate some or all of the machine readable instructions of the flowcharts of FIGS. 5, 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 5, 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement example interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 5, 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations.

The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 5 and 6 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 5, 6 may be executed by one or more of the cores 802 of FIG. 8, a second portion of the machine readable instructions represented by the flowcharts of FIGS. 5, 6 may be executed by the FPGA circuitry 900 of FIG. 9, and/or a third portion of the machine readable instructions represented by the flowcharts of FIGS. 5, 6 may be executed by an ASIC. It should be understood that some or all of the circuitry of FIG. 9 may, thus, be instantiated at the same or different times. Some or all of the circuitry may be instantiated, for example, in one or more threads executing concurrently and/or in series. Moreover, in some examples, some or all of the circuitry of FIG. 9 may be implemented within one or more virtual machines and/or containers executing on the microprocessor.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that automatically connect a display when a discrete card is in a D3 power state. Disclosed systems, methods, apparatus, and articles of manufacture improve the efficiency of using a computing device by enabling a HPD event to cause a discrete card to wake from a D3 power state, instead of waiting for an external event to cause the power state of the discrete card to change. The automatic wake of the discrete card and automatic connection of a display reduces latency and improves user experience. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to reduce display connection latency are disclosed herein. Further examples and combinations thereof include the following.

Example 1 includes an apparatus to reduce display connection latency, the apparatus comprising interface circuitry to detect when a display is plugged into a port, and notify processor circuitry of the detection, the processor circuitry to, in response to the notification, move discrete circuitry into a high power state, and the discrete circuitry to, while in the high power state, identify the display.

Example 2 includes the apparatus of example 1, wherein the discrete circuitry is in a low power state when the interface circuitry detects the display is plugged into a port.

Example 3 includes the apparatus of example 2, wherein the low power state is a D3hot power state.

Example 4 includes the apparatus of example 2, further including an auxiliary power source to power a first portion of the discrete circuitry in the low power state, and a main power source to power a second portion of the discrete circuitry in the high power state, the second portion greater than the first portion.

Example 5 includes the apparatus of example 4, wherein to notify the processor circuitry of the detection the interface circuitry is to send a wake signal to the first portion of the discrete circuitry, and in response to the wake signal, the first portion of the discrete circuitry is to send an interrupt to the processor circuitry, the interrupt to request the processor circuitry move the discrete circuitry to a high power state.

Example 6 includes the apparatus of example 1, wherein the discrete circuitry is powered off when the interface circuitry detects the display is plugged into a port.

Example 7 includes the apparatus of example 5, wherein the discrete circuitry is in a D3cold state when powered off Example 8 includes the apparatus of example 5, further including General Purpose Input Output (GPIO) circuitry to receive a notification of the detection from the interface circuitry, and send, using Advanced Configuration and Power Interface (ACPI) routines, an interrupt to the processor circuitry, the interrupt to request the processor circuitry move the discrete circuitry to a high power state.

Example 9 includes an apparatus to reduce display connection latency, the apparatus comprising a first amount of compute resources to, in response to first instructions from processor circuitry to enter a low power state, power off, a second amount of compute resources to, in response to first instructions from the processor circuitry to enter a low power state, receive power from an auxiliary power source, power management circuitry within the second amount of compute resources to, while in the low power state receive an indication that a display has been plugged into a port, and request, in response to an indication, access to a high power state, and a display engine within the first amount of compute resources to enter, in response to second instructions from the processor circuitry, the high power state, and identify, while in the high power state, the display.

Example 10 includes the apparatus of example 9, wherein the low power state is a D3hot power state, and the high power state is a D0 power state.

Example 11 includes the apparatus of example 9, wherein the first amount of compute resources and the second amount of compute resources are further to receive the second instructions, and in response to the second instructions, enter the high power state.

Example 12 includes the apparatus of example 9, wherein the power management circuitry is further to, while in the high power state, send an identification number of the display engine to the processor circuitry, and the display engine is further to, while in the high power state receive configuration parameters from the processor circuitry, and identify the display by executing a device discovery protocol, the device discovery protocol based on the configuration parameters.

Example 13 includes the apparatus of example 12, wherein to execute the device discovery protocol, the display engine is further to identify, from a plurality of ports, the port into which the display is plugged, and determine one or more parameters of the display.

Example 14 includes the apparatus of example 9, wherein the second amount of compute resources further includes a Schmitt trigger to, while in the low power state, filter a wake signal to remove one or more voltage bounces, and detection logic circuitry to, while in the low power state, provide the indication to the power management circuitry, the indication based on the filtered wake signal.

Example 15 includes the apparatus of example 9, wherein to request access to the high power state, the power management circuitry is to, in response to the indication, send an interrupt to the processor circuitry using a Peripheral Component Interconnect Express (PCIE) protocol.

Example 16 includes a non-transitory computer readable medium comprising instructions that, when executed, causes at least one processor to at least detect when a display is plugged into a port, in response to the detection, move discrete circuitry into a high power state, and the discrete circuitry to, while in the high power state, identify a display.

Example 17 includes the non-transitory computer readable medium of example 16, wherein the discrete circuitry is in a low power state when the instructions, when executed, cause the at least one processor to detect the display is plugged into a port.

Example 18 includes the non-transitory computer readable medium of example 17, wherein the low power state is a D3hot state.

Example 19 includes the non-transitory computer readable medium of example 17, wherein the instructions, when executed, cause the at least one processor to cause an auxiliary power source to power a first portion of the discrete circuitry in the low power state, and cause a main power source to power a second portion of the discrete circuitry in the high power state, the second portion greater than the first portion.

Example 20 includes the non-transitory computer readable medium of example 19, wherein the instructions, when executed, cause the processor to send, in response to the detection, a wake signal to the first portion of the discrete circuitry, the discrete circuitry to request access to the high power state in response to the wake signal.

Example 21 includes the non-transitory computer readable medium of example 16, wherein the discrete circuitry is powered off when the instructions, when executed, cause the at least one processor to detect the display is plugged into a port.

Example 22 includes the non-transitory computer readable medium of example 21, wherein the discrete circuitry is in a D3cold state when powered off.

Example 23 includes the non-transitory computer readable medium of example 21, wherein the instructions, when executed, cause the at least one processor to move, in response to a notification from General Purpose Input Output (GPIO) circuitry, the discrete circuitry into the high power state.

Example 24 includes a method to reduce display connection latency, the method comprising detecting when a display is plugged into a port, moving, in response to the detection, discrete circuitry into a high power state, and identifying, by the discrete circuitry and while in the high power state, a display.

Example 25 includes the method of example 24, wherein the discrete circuitry is in a low power state when the display is detected, and the method further includes receiving, by the discrete circuitry and while in the low power state, a wake signal, the wake signal based on the detection, requesting, by the discrete circuitry and while in the low power state, access to the high power state, the request based on the wake signal.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to reduce display connection latency, the apparatus comprising:
   discrete circuitry including power-island circuitry and graphics circuitry;
   connector circuitry configured to generate a wake signal in response to a display being plugged into a port;
   the power-island circuitry including a Schmitt Trigger and configured to, while the graphics circuitry is powered off and the discrete circuitry is in a low power state, filter the wake signal with the Schmitt trigger;
   processor circuitry configured to, based on the filtered wake signal, cause the discrete circuitry to exit the low power state by causing the graphics circuitry to power on; and
   the graphics circuitry configured to, in response to the discrete circuitry exiting the low power state, communicate with the display to obtain an identification.

2. The apparatus of claim 1, wherein the low power state is a D3hot power state.

3. The apparatus of claim 1, further including:
   an auxiliary power source configured to power the power-island circuitry in the low power state; and
   a main power source configured to power the graphics circuitry on.

4. The apparatus of claim 3, wherein the power-island circuitry is configured to send an interrupt to the processor circuitry, the interrupt to request the processor circuitry cause the graphics circuitry to power on.

5. The apparatus of claim 4, wherein to request the graphics circuitry be powered on, the power-island circuitry is configured to, in response to the filtered wake signal, send the interrupt to the processor circuitry using a Peripheral Component Interconnect Express (PCIE) protocol.

6. The apparatus of claim 1, wherein:
the power-island circuitry is further configured to send an identification number of the graphics circuitry to the processor circuitry; and
the graphics circuitry is further configured to, in response to the discrete circuitry exiting the low power state:
receive configuration parameters from the processor circuitry; and
communicate with the display and obtain the identification by executing a device discovery protocol, the device discovery protocol based on the configuration parameters.

7. The apparatus of claim 6, wherein to execute the device discovery protocol, the graphics circuitry is further configured to:
identify, from a plurality of ports, the port into which the display is plugged; and
determine one or more parameters of the display.

8. The apparatus of claim 1, wherein the power-island circuitry further includes
detection logic circuitry configured to, while in the low power state, provide an indication that the display is plugged into a port to the processor circuitry, the indication based on the filtered wake signal.

9. An apparatus to reduce display connection latency, the apparatus comprising:
graphics circuitry configured to, in response to first instructions from processor circuitry to enter a low power state, power off;
power-island circuitry configured to, in response to the first instructions from the processor circuitry to enter the low power state, receive power from an auxiliary power source;
connector circuitry configured to generate a wake signal in response to a display being plugged into a port;
the power-island circuitry including a Schmitt Trigger and configured to, while in the low power state:
filter the wake with the Schmitt trigger; and
request, based on the filtered wake signal, access to a high power state; and
the graphics circuitry configured to:
exit, in response to second instructions from the processor circuitry, the low power state by powering on; and
communicate, in response to exiting the low power state, with the display to obtain an identification.

10. The apparatus of claim 9, wherein:
the low power state is a D3hot power state; and
the high power state is a D0 power state.

11. The apparatus of claim 9, wherein the graphics circuitry and the power-island circuitry are further configured to:
receive the second instructions; and
in response to the second instructions, enter the high power state.

12. The apparatus of claim 9, wherein:
the power-island circuitry is further configured to, while in the high power state, send an identification number of the graphics circuitry to the processor circuitry; and
the graphics circuitry is further configured to, in response to entering the high power state:
receive configuration parameters from the processor circuitry; and
communicate with the display and obtain the identification by executing a device discovery protocol, the device discovery protocol based on the configuration parameters.

13. The apparatus of claim 12, wherein to execute the device discovery protocol, the graphics circuitry is further configured to:
identify, from a plurality of ports, the port into which the display is plugged; and
determine one or more parameters of the display.

14. The apparatus of claim 9, wherein the power-island circuitry further includes
detection logic circuitry configured to, while in the low power state, provide an indication that the display is plugged into the port to the power-island circuitry, the indication based on the filtered wake signal.

15. The apparatus of claim 9, wherein to request access to the high power state, the power-island circuitry is configured to, in response to the filtered wake signal, send an interrupt to the processor circuitry using a Peripheral Component Interconnect Express (PCIE) protocol.

16. A non-transitory computer readable medium comprising instructions that, when executed, causes at least one processor to at least:
cause discrete circuitry to enter a low power state where graphics circuitry within the discrete circuitry is powered off and power-island circuitry within the discrete circuitry is powered on;
receive an indication while the discrete circuitry is in the low power state, the indication provided by the power-island circuitry, the indication based on a wake signal that is generated by connector circuitry and filtered by a Schmitt Trigger when a display is plugged into a port;
in response to the indication, cause the discrete circuitry to exit the low power state; and
the graphics circuitry configured to, in response to the discrete circuitry exiting the low power state, communicate with the display to obtain an identification.

17. The non-transitory computer readable medium of claim 16, wherein the low power state is a D3hot state.

18. The non-transitory computer readable medium of claim 16, wherein:
the instructions, when executed, cause the at least one processor to:
cause an auxiliary power source to power the power-island circuitry while the discrete circuitry in the low power state; and
cause a main power source to power the graphics circuitry when the discrete circuitry exits the low power state.

19. The non-transitory computer readable medium of claim 16, wherein the power-island circuitry is further configured to request access to a high power state in response to receiving the filtered wake signal from the connector circuitry.

20. The non-transitory computer readable medium of claim 19, wherein to request access to the high power state, the power-island circuitry is configured to, in response to the filtered wake signal, send an interrupt to the processor using a Peripheral Component Interconnect Express (PCIE) protocol.

21. The non-transitory computer readable medium of claim 16, wherein:
the power-island circuitry is further configured to send an identification number of the graphics circuitry to the processor; and the graphics circuitry is further configured to, in response to the discrete circuitry exiting the low power state:
receive configuration parameters from the processor; and
communicate with the display and obtain the identification by executing a device discovery protocol, the device discovery protocol based on the configuration parameters.

22. The non-transitory computer readable medium of claim 21, wherein to execute the device discovery protocol, the graphics circuitry is further configured to:
identify, from a plurality of ports, the port into which the display is plugged; and
determine one or more parameters of the display.

23. The non-transitory computer readable medium of claim 16, wherein the power-island circuitry further includes
detection logic circuitry configured to, while in the low power state, provide the indication to the processor, the indication based on the filtered wake signal.

24. A method to reduce display connection latency, the method comprising:
causing, by processor circuitry, display circuitry to enter a low power state where graphics circuitry within the display circuitry is powered off and power-island circuitry within the display circuitry is powered on;
generating, by connector circuitry, a wake signal in response to a display being plugged into a port;
filtering, while the display circuitry is in the low power state and by a Schmitt Trigger, the wake signal;
causing, by the processor circuitry and based on the filtered wake signal, discrete circuitry to exit the low power state; and
communicating, by the graphics circuitry and in response to the discrete circuitry exiting the low power state, with the display to obtain an identification.

25. The method of claim 24, further including:
receiving, by the discrete circuitry and while in the low power state, the filtered wake signal; and
requesting, by the discrete circuitry and while in the low power state, access to a high power state, the request based on the filtered wake signal.

* * * * *

UNITED STATES PATENT AND TRADEMARK OFFICE
CERTIFICATE OF CORRECTION

PATENT NO. : 12,117,878 B2
APPLICATION NO. : 17/831173
DATED : October 15, 2024
INVENTOR(S) : Pappu et al.

Page 1 of 1

It is certified that error appears in the above-identified patent and that said Letters Patent is hereby corrected as shown below:

In the Claims

Column 29, Claim 9, Line 42, Delete the text "filter the wake with the Schmitt trigger; and" Insert the text --filter the wake signal with the Schmitt trigger; and--.

Signed and Sealed this
Twenty-sixth Day of November, 2024

Katherine Kelly Vidal
*Director of the United States Patent and Trademark Office*